2,868,750

STABLE ORGANOSILOXANE-TITANATE COMPOSITION CONTAINING NITRO COMPOUND

John W. Gilkey, Midland, Mich., assignor to Dow Corning Corporation, Midland, Mich., a corporation of Michigan No Drawing. Application September 28, 1956
Serial No. 612,885

10 Claims. (Cl. 260—29.1)

This invention relates to air-drying organosilicon-titanium compositions suitable for imparting water-repellant characteristics to fibrous materials and particularly to leather.

Organosilicon compositions have long been employed in various embodiments for imparting water repellency to a wide variety of materials including masonry, textiles, leather and wood. Particularly useful for such purposes are mixtures of organosilicon compounds and titanium compounds. For example, United States Patent No. Re. 23,879 sets forth a leather water repellent comprising mixtures of certain defined titanium esters and certain defined organosilicon compositions. United States Patent No. 2,721,855 sets forth mixtures of defined organosilicon compositions and defined titanium esters suitable for use as masonry water repellents. Other similar patents and applications are well known and further elaboration is unnecessary.

One obvious means of marketing a water repellent chemical is by direct sale to the consumer. For example, many shoe stores and shoe repair shops sell compositions for treating leather to impart water repellency thereto. The organosiloxane-titanium ester compositions suitable for rendering leather water repellent are sold in such a manner in such stores.

The organosiloxane-titanium ester compositions are packaged as dilute solutions in organic solvents placed in clear glass bottles of convenient and popular sizes. Such bottles are generally displayed on the counters and in the windows of retail stores where they are sold. It has been found that when these materials are so displayed that they are subjected to the rays of the sun, the solution gradually changes color.

The organosiloxane-titanium ester-organic solvent mixture has a light yellow color. The action of sunlight on the mixture is to gradually change the color to blue. The blue shade darkens with additional sunlight until it becomes a dark-navy blue similar to blue-black ink.

The change in physical appearance of the solution is, of course, most disconcerting to the retail merchant. Actually, the solution retains its efficacy and will render leather water repellent whether the solution is blue or yellow. Nevertheless, the retail merchant does not like to sell a product which has changed color from an innocuous light yellow to a very dark blue during the time it has been in his store. What is even worse, the solution is to be employed in treating shoes, etc., and a deep blue or blue-black solution can well be expected to alter the color of brown or other colors of leather.

Furthermore, the problem is more acute because when the dark blue solutions are exposed to the air they revert to their original light yellow color. The customer buying a blue solution would certainly be surprised, to say the least, when the solution turns yellow upon being opened.

The situation outlined above is a serious obstacle to continued acceptance of the organosiloxane-titanium ester solutions by the retail merchant and the consumer. It is the primary object of this invention to prevent or to minimize the change of color in the solutions as noted above.

The present invention relates to a mixture of a benzene soluble organopolysiloxane, a benzene soluble titanic acid ester of an aliphatic alcohol of less than 20 carbon atoms, an organic solvent and a nitrogen containing compound selected from the group consisting of nitroalkanes and nitrobenzene.

The organosilicon compositions which are operable herein include any organosiloxane suitable for use in conjunction with the titanium esters defined below as water repellent agents.

Particularly suitable are the organosiloxane systems defined in United States Patent No. 2,672,455, dated March 16, 1954, and reissued as Re. 23, 879, dated September 28, 1954. Said organo-siloxane is a mixture of (1) a methylpolysiloxane copolymer composed of $$(CH_3)_3SiO_{.5}$$

units and $SiO_2$ units, said units being present in relative amounts such that the ratio of $CH_3$ radicals to Si atoms is from 1.0:1 to 2.4:1, preferably from 1.0:1 to 1.5:1, and (2) a polysiloxane of the unit formula $$R_nSiO_{\frac{4-n}{2}}$$

where R is an alkyl radical, an alkenyl radical of less than 4 carbon atoms, a monocylic aryl radical, or a combination of the foregoing, and $n$ has an average value of 2.0 to 2.9, there being at least one R attached to each Si in the molecule.

The cited patent Re. 23,879 adequately identifies such mixtures. The methods of producing the siloxane involved are well known in the art.

Another specific organosilicon compound particularly suitable for use herein is defined in United States Patent No. 2,721,855, dated October 25, 1955, assigned to Dow Corning Corporation. Said organosilicon compound is a benzene soluble polymeric organosilicon compound having on the average .9 to 1.5 monovalent hydrocarbon radicals per Si atom and on the average .1 to 1.5 alkoxy radicals per Si atom in the molecule and a major portion of the polymer linkages therein being Si—O—Si, any remaining polymer linkages being Si—Si and/or Si—R—Si linkages. The methods for producing such organosilicon compounds are well known and a particular method is set forth in said Patent No. 2,721,855.

It is to be clearly understood that whereas the organosilicon compounds specifically set forth in the foregoing paragraphs are particularly suited for use herein, any organosilicon composition operable in water repellent mixtures can be employed herein.

Any benzene soluble titanic acid ester of an aliphatic alcohol of less than 20 carbon atoms can be employed in this invention. Monomeric esters of the formula Ti(OR)$_4$, where R represents any hydrocarbon radical, and polymeric materials containing less than 4 hydrocarbonoxy radicals per Ti atom are operable. The polymeric materials can be partially hydrolyzed esters containing Ti—O—Ti linkages. Esters of titanic acid and polyhydric alcohols containing linkages of the type Ti—O—R—O—Ti can also be employed. Any mixture of the various types of esters can be employed.

Specific examples of titanium esters operable in this invention are esters of monohydric alcohols such as methyl, ethyl, allyl, isopropyl, cyclohexyl, octyl and octadecyl alcohols; esters of dihydric alcohols such as ethylene glycol, propylene glycol, octylene glycol, diethylene glycol, tripropylene glycol, and tetraethylene glycol and esters of trihydric alcohols such as glycerine.

The organic solvents employed herein should not be harmful to the surface to be treated. If the solution is to be used on leather, a non-aromatic solvent such as Stoddard solvent, naphtha mineral spirits, perchloroethylene, etc. should be used. Benzene, toluene, xylene and other petroleum hydrocarbon solvents can be used when the ultimate use is for fabrics, masonry, etc.

The additives employed in this invention are nitrogen containing compounds including nitroalkanes such as nitromethane, nitroethane and nitropropane and nitrobenzene. These materials are well known and are commercially available. They are added in amounts of more than .0002 mol per ounce of the siloxane-organic solvent solution.

The upper limit on the amount of additive employed is a practical limit. Since the additive raises the cost of the product, it is desirable to employ only as much as is necessary to reduce or eliminate the objectionable color change. The use of larger amounts such as for example .1 mol per ounce, is unnecessary and would involve an unwarranted increase in cost. The addition of larger amounts is, nevertheless, operative.

The compositions of this invention are prepared simply by admixing the various ingredients. No particular order of addition is required.

The compositions of this invention have been tested and found to retain their original water-repellent qualities with the nitroalkanes or nitrobenzene additives. No impairment of quality can be noted and the new compositions resist the tendency to turn blue when exposed to sunlight. The new compositions are capable of all of the uses to which the old water-repellent compositions were put.

The examples which follow are included to aid those skilled in the art to better understand this invention. The examples are not intended to restrict the scope of this invention, the proper scope of which is delineated in the appended claims. All parts and percentages in the examples are based on weight unless otherwise specified.

EXAMPLE 1

A solution suitable for treating leather to impart water-repellency thereto was produced by dissolving in 80 parts of an aliphatic hydrocarbon solvent 6 parts of tetraoctyl titanate, 7 parts of a dimethylsiloxane polymer having a viscosity of 350 cs. at 25° C., and 7 parts of a methylpolysiloxane copolymer composed of $(CH_3)_3SiO_{.5}$ units and $SiO_2$ units, said units being present in relative amounts such that the $CH_3$ to Si ratio is in the range 1.0:1 to 1.5:1, the solvent employed being high-flash, naphtha mineral spirits.

Four ounce samples of the above solution were placed in glass bottles. One bottle was sealed without further additives.

Nitrogen containing compounds within the scope of this invention were added in varying amounts to each of the other bottles. All of the bottles were then subjected to the direct rays emanating from a carbon arc with a quartz crystal in a commercial fadeometer. The results are set forth in Table I below.

Table I

| Nitrogen Compound | Amount added | | Time to turn blue, hours |
|---|---|---|---|
| | grams | mols | |
| none | | | 3–5 |
| nitromethane | .07 | .0012 | 80 |
| nitroethane | .09 | .0012 | 100 |
| 1-nitropropane | .11 | .0012 | 62 |
| 1-nitropropane | .07 | .0008 | 20 |
| 2-nitropropane | .10 | .0012 | 80 |
| 2-nitropropane | .07 | .0008 | 60 |
| nitrobenzene | .14 | .0012 | 80+ |

The results tabulated above show that the nitro compounds employed in this invention significantly improve the color stability of the leather water-repellent solution. A comparison of the water-repellency imparted to leather with the compositions of this invention revealed that they are in every way suitable for this purpose and impart water repellent properties equivalent to those achieved with the solutions without nitrogen compound additives. No harmful or deleterious effects could be noted when the solutions of this invention were used as leather water repellents.

EXAMPLE 2

Another series of bottles were filled with 4 ounce samples of the water repellent solution of Example 1. Nitromethane in varying amounts was added to some bottles and 1-nitropropane to others. Some bottles remained untreated as controls. One series of bottles was subjected to the carbon arc light as in Example 1. A second series was placed in the direct rays of the sun in Florida. The results are tabulated below in Table II.

Table II

| Additive | Amt. of Additive | | Time to turn blue | |
|---|---|---|---|---|
| | grams | mols | Florida Sunlight | Fade-Ometer, hours |
| none (control) | | | 3 days | 3–5 |
| nitromethane | .035 | .0006 | 2 weeks | 60 |
| same | .07 | .0012 | 4 weeks | 100 |
| same | .14 | .0024 | 7 weeks | 180+ |
| same | .35 | .0060 | 12+ weeks | 180+ |
| 1-nitropropane | .055 | .0006 | 6 weeks | 60 |
| same | .22 | .0024 | 8 weeks | 180+ |
| same | .55 | .0060 | 12+ weeks | 180+ |

EXAMPLE 3

A dimethyl siloxane fluid having a viscosity of 350 cs. at 25° C., tetraoctyl titanate, naphtha mineral spirits and nitromethane, nitroethane, nitropropane or nitrobenzene were admixed and tested as in Example 1 and equivalent results were obtained.

EXAMPLE 4

The dimethylsiloxane ingredient was omitted from the mixture of Example 1 and the amount of the copolymeric siloxane ingredient was doubled. Again the results achieved showed a remarkable color stability superiority in the compositions of this invention over the same compositions absent the nitrogen compound.

EXAMPLE 5

When tetraethyl titanate, tetraallyl titanate, octylene glycolyl titanate, tetra 2-ethyl hexyl titanate, or any mixture thereof is employed in the method of Example 1, similar results are achieved.

That which is claimed is:

1. As a composition of matter, a mixture comprising (1) 15 to 50 percent by weight of a titanium compound from the group consisting of compounds of the general formula $Ti(OR)_4$ and aliphatic hydrocarbon soluble partial hydrolyzates thereof wherein R is selected from the group consisting of aliphatic hydrocarbon radicals of less than 13 carbon atoms and hydroxylated aliphatic hydrocarbon radicals of less than 13 carbon atoms and containing less than 4 OH groups; (2) 5 to 70 percent by weight of a polysiloxane copolymer composed of $(CH_3)_3SiO_{.5}$ units and $SiO_2$ units in such proportion that the ratio of $CH_3$ units to Si atoms is in the range 1.0:1 to 2.4:1; and (3) 15 to 80 percent by weight of a polysiloxane of the unit formula

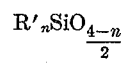

where each R' is a radical selected from the group consisting of alkyl and alkenyl radicals of less than 4 carbon atoms and monocyclic aryl radicals and $n$ has an average value of 2.0 to 2.9, each Si atom in said polysiloxane (3)

having at least one of the defined hydrocarbon radicals attached thereto, (4) from .0002 mol to 0.1 mol per ounce of total mixture of a nitrogen containing compound wherein the only functional groups present are —$NO_2$ groups, said compounds being selected from the group consisting of nitro-methane, nitro-ethane, nitro-propane and nitro-benzene, and (5) an organic solvent.

2. The composition of claim 1 where each R' is an alkyl radical of less than 4 carbon atoms.

3. The composition of claim 1 wherein R is a butyl radical.

4. The composition of claim 1 where R' is methyl, R is butyl and the ratio of methyl radicals to silicon atoms in the polysiloxane copolymer (2) is from 1.0:1 to 1.5:1.

5. The composition of claim 1 wherein the polysiloxane (3) is a phenylmethylsiloxane.

6. The composition of claim 1 where R is an octyl radical.

7. The composition of claim 1 wherein the nitrogen containing compound (4) is nitromethane.

8. The composition of claim 1 wherein the nitrogen containing compound (4) is nitroethane.

9. The composition of claim 1 wherein the nitrogen containing compound (4) is a nitropropane.

10. The composition of claim 1 wherein the nitrogen containing compound (4) is nitrobenzene.

References Cited in the file of this patent

UNITED STATES PATENTS

Re. 23,879  Currie _____ Sept. 28, 1954

OTHER REFERENCES

Bogin: "Paint Oil & Chemical Review," Aug. 27, 1942, page 9 relied on.

UNITED STATES PATENT OFFICE
Certificate of Correction

Patent No. 2,868,750

January 13, 1959

John W. Gilkey

It is hereby certified that error appears in the printed specification of the above numbered patent requiring correction and that the said Letters Patent should read as corrected below.

Column 1, line 54, for "disconnecting" read —disconcerting—.

Signed and sealed this 28th day of April 1959.

[SEAL]

Attest:
T. B. MORROW,
*Attesting Officer.*

ROBERT C. WATSON,
*Commissioner of Patents.*